United States Patent
Fyke et al.

(10) Patent No.: US 8,611,861 B2
(45) Date of Patent: Dec. 17, 2013

(54) COMMUNICATIONS SYSTEM INCLUDING PERSONAL INFORMATION TOKEN TO STORE A PERSONALIZED LIST AND ASSOCIATED METHODS

(75) Inventors: Steven Henry Fyke, Waterloo (CA); David Ryan Walker, Waterloo (CA); Jerome Pasquero, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 126 days.

(21) Appl. No.: 13/070,798

(22) Filed: Mar. 24, 2011

(65) Prior Publication Data

US 2012/0244837 A1 Sep. 27, 2012

(51) Int. Cl.
*H04M 1/66* (2006.01)

(52) U.S. Cl.
USPC .......... 455/411; 455/41.2; 455/435; 370/338; 726/9

(58) Field of Classification Search
USPC ............. 455/411, 41.2, 435; 370/338; 726/9
See application file for complete search history.

(56) References Cited

U.S. PATENT DOCUMENTS

| | | | |
|---|---|---|---|
| 5,668,875 A | 9/1997 | Brown et al. | 380/23 |
| 6,771,946 B1 | 8/2004 | Oyaski | |
| 7,123,874 B1 | 10/2006 | Brennan | |
| 2006/0098238 A1* | 5/2006 | Ylonen | 358/402 |
| 2008/0227393 A1 | 9/2008 | Tang et al. | |
| 2008/0255725 A1 | 10/2008 | Geisler et al. | |
| 2008/0268768 A1 | 10/2008 | Brown et al. | |
| 2008/0297336 A1 | 12/2008 | Lee | |
| 2009/0215466 A1 | 8/2009 | Ahl et al. | |
| 2010/0029203 A1 | 2/2010 | Hebiguchi et al. | |
| 2012/0220222 A1* | 8/2012 | Hill | 455/41.1 |

FOREIGN PATENT DOCUMENTS

| | | |
|---|---|---|
| EP | 2146449 A1 | 1/2010 |
| EP | 2182660 A1 | 5/2010 |
| GB | 2365699 | 2/2002 |
| WO | WO2008/142367 | 11/2008 |
| WO | 2009081699 A1 | 7/2009 |

OTHER PUBLICATIONS

Jovanov et al., "A wireless body area network of intelligent motion sensors for computer assisted physical rehabilitation", Journal of NeuroEngineering and Rehabilitation, 2005, 2: 6, Mar. 1, 2005, pp. 1-7.

http:/len.wikipedia.org/wiki/Body_Area_Network, p. 1-2, Feb. 11, 2008.

(Continued)

*Primary Examiner* — Amancio Gonzalez
(74) *Attorney, Agent, or Firm* — Allen, Dyer, Doppelt, Milbrath & Gilchrist, P.A.

(57) ABSTRACT

A communications system includes an electronic device a first wireless personal area network (WPAN) device, and a first processor coupled to the first WPAN device. The communications system also includes a personal information token with a second processor and a second WPAN device coupled thereto. The second processor is configured to store at least one subscription key, and wirelessly transmit the at least one subscription key to the electronic device based upon proximity therewith, via the second WPAN device. The first processor, via the cellular device, then subscribes the electronic device to the cellular network based upon the subscription key.

20 Claims, 9 Drawing Sheets

(56) References Cited

OTHER PUBLICATIONS

Julien Ryckaert, et al., "Ultra-Wide Band Transmitter for Wireless Body Area Networks", IMEC, Online: http://www.eurasip.org/proceedings/ext/ist05/papers/266.pdf, Dec. 2005, pp. 1-4.

Jordi Agud Ruiz, et al., "A Study on the Transmission Characteristics of the Human Body Towards Broadband Intra-body Communications", IEEE Xplore, Consumer Electronics, 2005, (ISCE 2005), Proceedings of the Ninth International Symposium on Jun. 14-16, 2005, pp. 99-104.

"ALP's 'Electric-Field Communication' Turns You into a Human Cable", CEATEC Japan 2009, Oct. 7, 2009; pp. 1-8; Source: Gigazine, online: http://en.gigazine.net/index.php?/news/comments/20091006_alps_ceatec_japan_2009/.

Pilcher, James, "Inventors' device blocks cell use around driver", The Cincinnati Enquirer, (Updated: Apr. 14, 2009), pp. 1-2, Source: USAToday, online: http://www.usatoday.com/money/autos/2009-04-13-inventor-block-cellphone_N.htm.

"Body hammered: very personal area networks", from The Institution of Engineering and Technology Website, Jul. 6, 2009, pp. 1-2, http://kn.theiet.org/magazine/issues/0912/body-hammered-0912.cfm.

"Car Key Jams Teen Drivers' Cell Phones and Texting", University of Utah, Dec. 10, 2008, pp. 1-4, Source: Newswise, online: http://www.newswise.com/articles/view/547297.

"DriveAssist Overview: Manage Mobile Phone Use While Driving", p. 1, Aug. 3, 2010, Source: Aegis Mobility, online: http://www.aegismobility.com/home/solutions/driveassist-overview.

"Body Area Network—A Key Infrastructure Element for Patient-Centered Telemedicine", from the book Wearable eHealth Systems for Personalised Health Management: State of the Art and Future Challenges, published in 2004, pp. 1-2, http://iospress.metapress.com/content/rfk6md9jn5cl9r98/.

"NTT RedTacton Human Area Networks", from i4u.com, Feb. 20, 2005, p. 1, www.i4u.com/article2936.html.

"Personalization", Red Tacton brochure, 2 pages; Source: Red Tacton, 2005, pp. 1-2, Source: http://www.readtacton.com/en/field/03.html.

Safe Driving Systems, Product FAQs, Source: Safe Driving Systems, 2010, pp. 1-2, Source: http:I/safedrivingsystems.com/support/product-faq/.

\* cited by examiner

COMMUNICATIONS SYSTEM INCLUDING PERSONAL INFORMATION TOKEN TO STORE A PERSONALIZED LIST AND ASSOCIATED METHODS

TECHNICAL FIELD

The present disclosure relates to the field of communications systems, and, in particular, to communications systems including personal information tokens for storing personalized lists and for communication with electronic devices.

BACKGROUND

In the workplace and home today, there typically are a variety of electronic devices, such as telephones, desktop computers, and laptop computers, that are communally used. While the sharing of a particular electronic device by multiple individuals may save space and money, it also presents certain challenges.

For example, some electronic devices may be personalized according to personal preferences. In some instances, individuals who share an electronic device may either re-personalize the electronic device each time they use it, or create separate accounts for each individual, with each account having storable personalization preferences, where applicable.

DETAILED DESCRIPTION

The present description is made with reference to the accompanying drawings, in which various embodiments are shown. However, many different embodiments may be used, and thus the claims should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communications system is provided herein which may be for communicating with a cellular network. The communications system may include an electronic device comprising an optional display, a cellular device, a first wireless personal area network (WPAN) device, and a first processor coupled to the display, the cellular device, and the first WPAN device. The communications system may also include a personal information token comprising a second processor and a second WPAN device coupled thereto. The second processor may be configured to store at least one subscription key, and wirelessly transmit the at least one subscription key to the electronic device based upon proximity therewith, via the second WPAN device, so that the first processor, via the cellular device, subscribes the electronic device to the cellular network based upon the subscription key.

The first processor may also be configured to associate the electronic device with a telephone number associated with the subscription key when the electronic device is subscribed to the cellular network. In addition, the first processor may also be configured to store a primary subscription key, to subscribe the electronic device to the cellular network based upon the primary subscription key, and to associate the electronic device with a telephone number associated with the primary subscription key.

Further, the first processor may also be configured to associate the electronic device with at least one e-mail address associated with the subscription key when the electronic device is subscribed to the cellular network. Also, the first processor may also be configured to unsubscribe the electronic device from the cellular network based upon a lack of proximity with the personal information token.

In some application, the second processor may also be configured to store personal preferences, and wirelessly transmit the personal preferences, via the second WPAN device, to the electronic device based upon proximity therewith. In these applications, the first processor may also be configured to operate based upon the personal preferences.

The personal preferences comprise at least one of display appearances, ringtone settings, and application settings. Furthermore, the personal preferences may comprise at least one personalized list, and the first processor may operate based upon the personalized list by displaying the at least one personalized list on the display.

The at least one personalized list may comprise at least one of a contacts list and a favorite web sites list, and the first processor may cease to operate based upon the personal preferences based upon passage of a period of time. The second processor and second WPAN device may also be configured to enable operation of the electronic device. The first and second WPAN devices may comprise respective first and second wireless body area network (WBAN) transceivers.

A related method aspect is directed to a method of operating a communications system including an electronic device comprising a cellular device and first wireless personal area network (WPAN) device coupled to a first processor, and a personal information token comprising a second WPAN device coupled to a second processor. The method may comprise storing at least one subscription key using the second processor. The method may also include wirelessly transmitting, using the second wireless personal area network (WPAN) device, the at least one subscription key to the electronic device based upon proximity therewith so that the first processor, via the cellular device, subscribes the electronic device to a cellular network based upon the subscription key.

Figure 1:
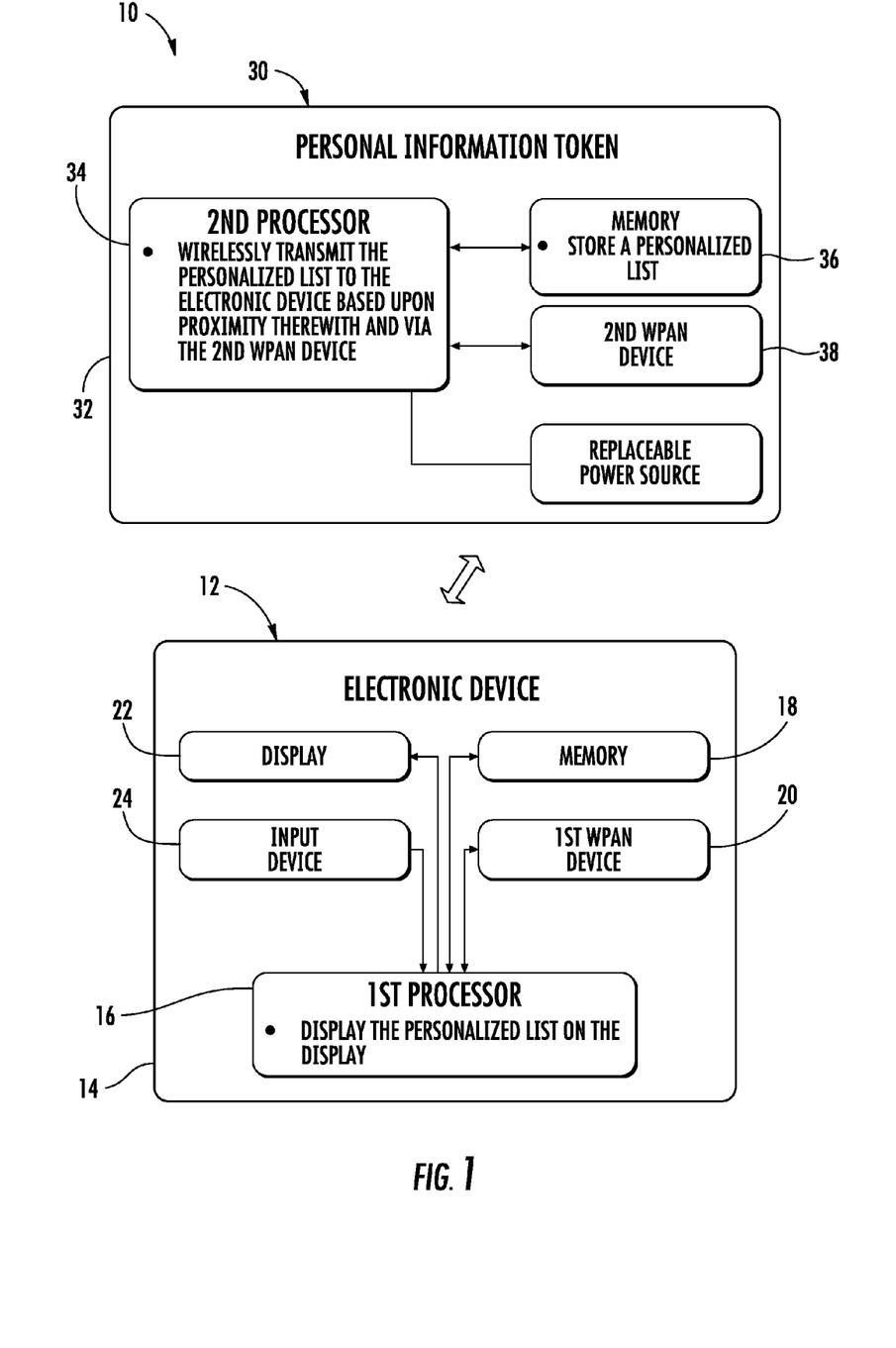
FIG. 1 is a schematic block diagram of a communications system in accordance with an example embodiment.

With reference initially to FIG. 1, a communications system 10 is now described. The communications system 10 includes an electronic device 12 and a personal information token 30. Example electronic devices 12 may include portable or personal media players (e.g., music or MP3 players, video players, etc.), remote controls (e.g., television or stereo remotes, etc.), portable gaming devices, portable or mobile telephones, smartphones, tablet computers, etc.

The electronic device 12 includes a housing 14 carrying a first processor 16, which is in turn coupled to a memory 18, a first wireless personal area network (WPAN) device 20, a display 22, and an input device 24. The first WPAN device 20 may be a WPAN transceiver or receiver, for example. The memory 18 may include volatile portions, such as random access memory (RAM), and non-volatile portions, such as flash memory or a hard drive, for example.

The first WPAN device 20 may operate according to a protocol described by any section of the Institute for Electrical and Electronics Engineers (IEEE) 802.15 standard, which is hereby incorporated by reference in its entirety. In addition, it should be noted that the first WPAN device 20 may be a wireless body area network (WEAN) transceiver, and may operate according to the IEEE 802.15.6 standard, for example, although other suitable personal or short-range communications formats may also be used.

The display 22 may comprise a typical liquid crystal display (LCD), and the input device 24 may be a keyboard, mouse, touchpad, or combinations thereof. In addition, it should be appreciated that the display 22 may comprise a touch sensitive display, and may therefore also function as at least part of the input device 24.

The electronic device 12 is personalizeable. Indeed, in some applications, the electronic device 12 may be operable according to a plurality of accounts, with each account having a variety of account settings that personalize the electronic device 12. For example, the account settings may include a list of favorite web sites, or a list of contacts. The account settings may also include a list of executable programs, access to an e-mail account or accounts, or access to a set of personal files, for example.

The personal information token 30 may be wearable or otherwise carryable. For example, the personal information token 30 may be carried on a belt, may be worn about a neck as a necklace, may be worn about a wrist as a bracelet, or may be attached to a key chain, etc. The personal information token 30 may also be implanted in a body, in some applications. The personal information token 30 includes a portable housing 32 carrying a second processor 34, which is, in turn, coupled to a memory 36 and a second WPAN device 38. The second WPAN device may also be a WPAN transceiver or receive, for example. The memory 36 may include both volatile and non-volatile portions. The second WPAN device 38, like the first WPAN device 20, may operate according to the IEEE 802.15 standard, and may be a WBAN transceiver.

The memory 36 of the personal information token 30 stores at least one personalized list. It should be appreciated that the memory 36 may store any number of personalized lists, and that these personalized lists may store a variety of items. For example, the memory 36 may store a first personalized list including contacts, and may store a second personalized list including favorite web sites. The second processor 34 wirelessly transmits the personalized list to the electronic device 12 based upon proximity therewith, and via the second WPAN device 37.

The electronic device 12 receives the personalized list via the first WPAN device 20, and the first processor 16 then displays the personalized list on the display 22. This functionality advantageously allows the electronic device 12 to be personalized based upon the proximity of the personal information token 30, and without further input.

Figure 2:
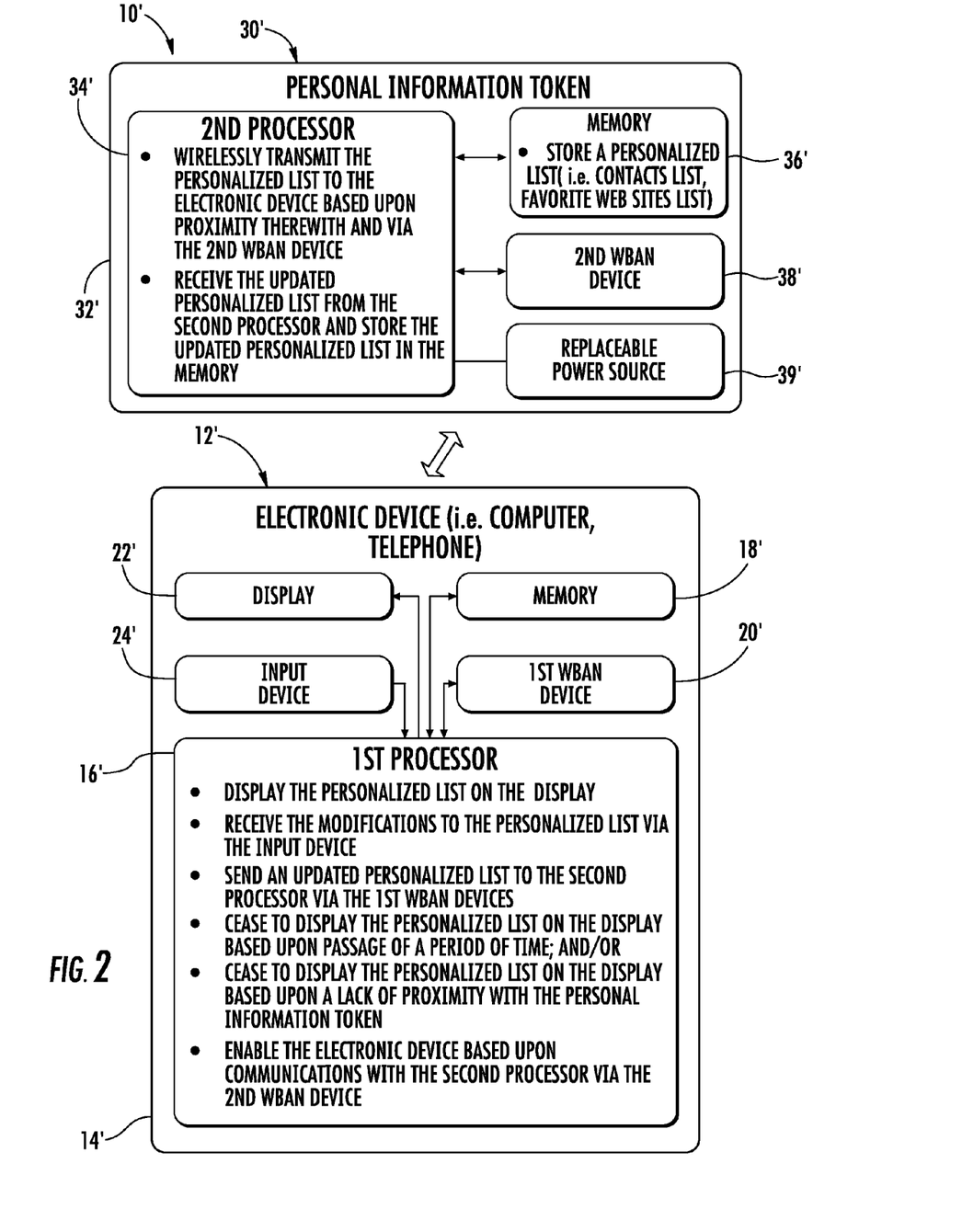
FIG. 2 is a more detailed schematic block diagram of the communications system of FIG. 2 in accordance with an alternative example.

A more detailed embodiment of a communications system 10' is now described with reference to FIG. 2. Here, the first and second WPAN devices 20', 38' comprise first and second WBAN transceivers, respectively. Additionally, the personalized list stored in the memory 36' of the personal information token 30' comprises a contacts list or a favorite web sites list. Moreover, the first processor 14' of the electronic device 12' is configured to accept modifications to the personalized list via the input device 24', and to generate an updated personalized list based upon those modifications. The first processor 16' then sends the updated personalized list to the second processor 34' via the first WBAN transceiver 20'. Such modifications may include additions to the personalized list, deletions from the personalized list, and a reordering of items on the personalized list, for example.

The second processor 34' receives the updated personalized list via the second WBAN transceiver 38', and stores the updated personalized list in the memory 36'. This advantageously allows changes to be easily made to the personalized list.

In some applications, the first processor 14' may generate the updated personalized list without express direction to do so. For example, the first processor 14' may reorder the personalized list based upon the frequency of selection of items thereon. Once this updated and reordered personalized list is transmitted to the personal information token 30' and stored in the memory 36' thereof, this may advantageously ensure that the items of the personalized list that are most often used are sent to the electronic device 12' first, when the personalized list is sequentially sent thereto. Additionally, the first processor 14' may add items to the personalized list based upon a device event (i.e. the first processor may add the phone number of incoming calls to a contacts list, or the processor may add to a web usage history web sites visited by the electronic device 12').

Alternatively, the first processor 14' may flag certain entries of the personalized list without express direction to do so, and may generate the updated personalized list based thereupon. The flagged entries may be based upon their frequency of selection. Once this updated personalized list is transmitted to the personal information token 30' and stored in the memory 36' thereof, the second processor 34' may transmit the personalized list non-sequentially to the electronic device 12', such that the flagged entries are sent before the rest of the entries. This may help ensure that the items of the personalized list that are most often used are sent to the electronic device 12' first, when the personalized list is non-sequentially sent thereto.

In some applications, the memory 36' of the personal information token 30' may store account access information related to a given account upon which the electronic device 12' is operable, and the second processor 34' may enable operation of the electronic device 12' based upon that account access information. This may advantageously allow access to the account without further input of a password, for example, saving time, and enhancing convenience of use of the electronic device 12'.

After displaying the personalized list on the second display 22', the first processor 16' may cease to display the personalized list on the display based upon passage of a period of time. Moreover, in some applications, the first processor 16' may disable operation of the electronic device 12' based upon the account access information, based upon passage of a period of time (i.e. the first processor 16' may log out of the account based upon the passage of the period of time).

Furthermore, the first processor 16' may cease to display the personalized list on the display 22' based upon a lack of proximity with the personal information token 30'. This advantageously increases security, as the personalized list will no longer be displayed when the personal information token 30' (and presumably the body carrying that personal information token) is no longer in proximity with the electronic device 12'.

It should be noted that the first WPAN device 20' and second WPAN device 38' may communicate using encrypted communications, such that the personalized list is not easily intercepted. In addition, in some applications, the first processor 16' may display, on the display 22', a prompt requesting manual entry of a password via the input device 24', after receipt of the personalized list and before display of the personalized list.

Figure 3:
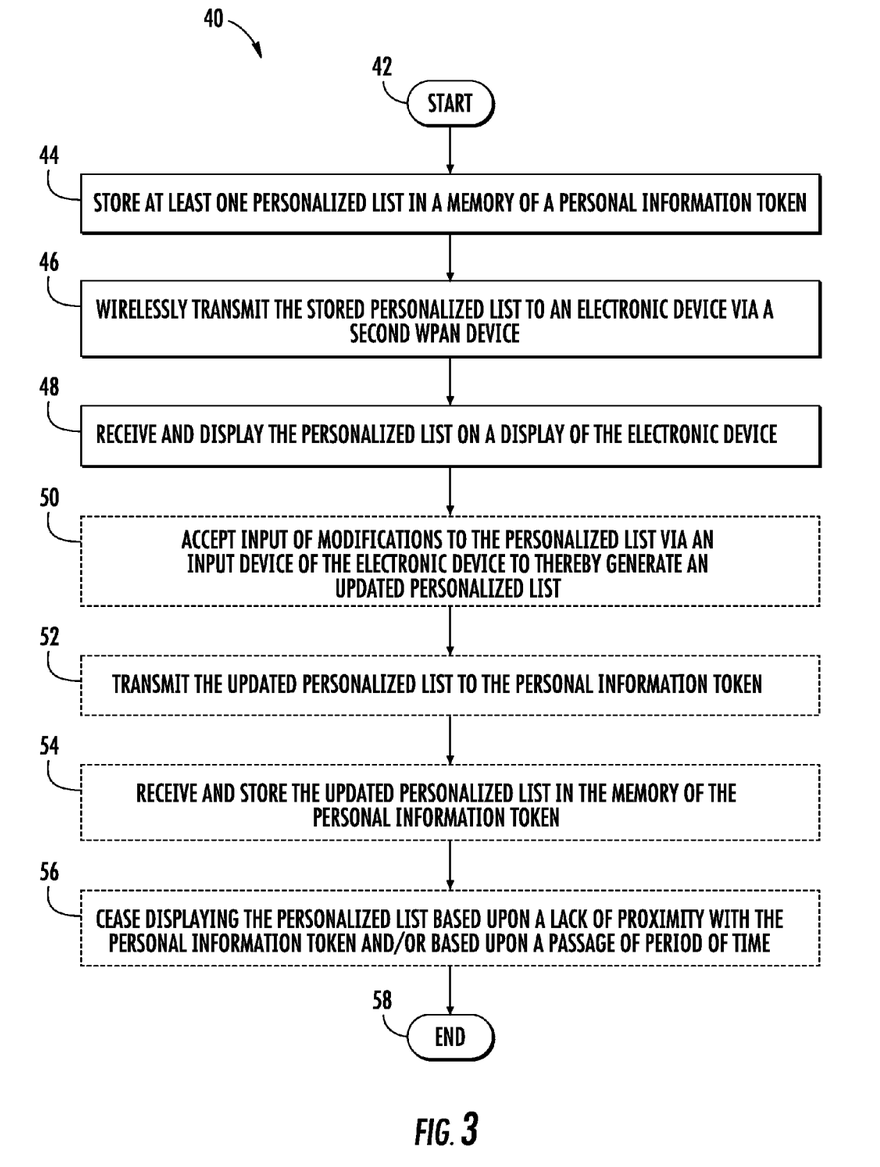
FIG. 3 is a flowchart illustrating method aspects associated with the communications system of FIGS. 1 and 2.

With reference to the flowchart 40 of FIG. 3, a method of operating the communications system of the present disclosure is now described. After the start (Block 42), at least one personalized list is stored in the memory of the personal information token (Block 44). The stored personalized list is then wirelessly transmitted to the electronic device via the second WPAN device (Block 46). The first processor receives the personalized list, and displays it on the display of the electronic device (Block 48).

Optionally, the first processor accepts input of modifications to the personalized list via the input device, and generates an updated personalized list thereupon (Block 50). The updated personalized list is then transmitted to the personal information token (Block 52).

The second processor receives the updated personalized list and stores it in the memory of the personal information token (Block 54). The second processor may also optionally cease displaying the personalized list based upon a lack of proximity with the personal information token, and/or based upon passage of a period of time (Block 56). Block 58 indicates the end of the method.

Figure 4:
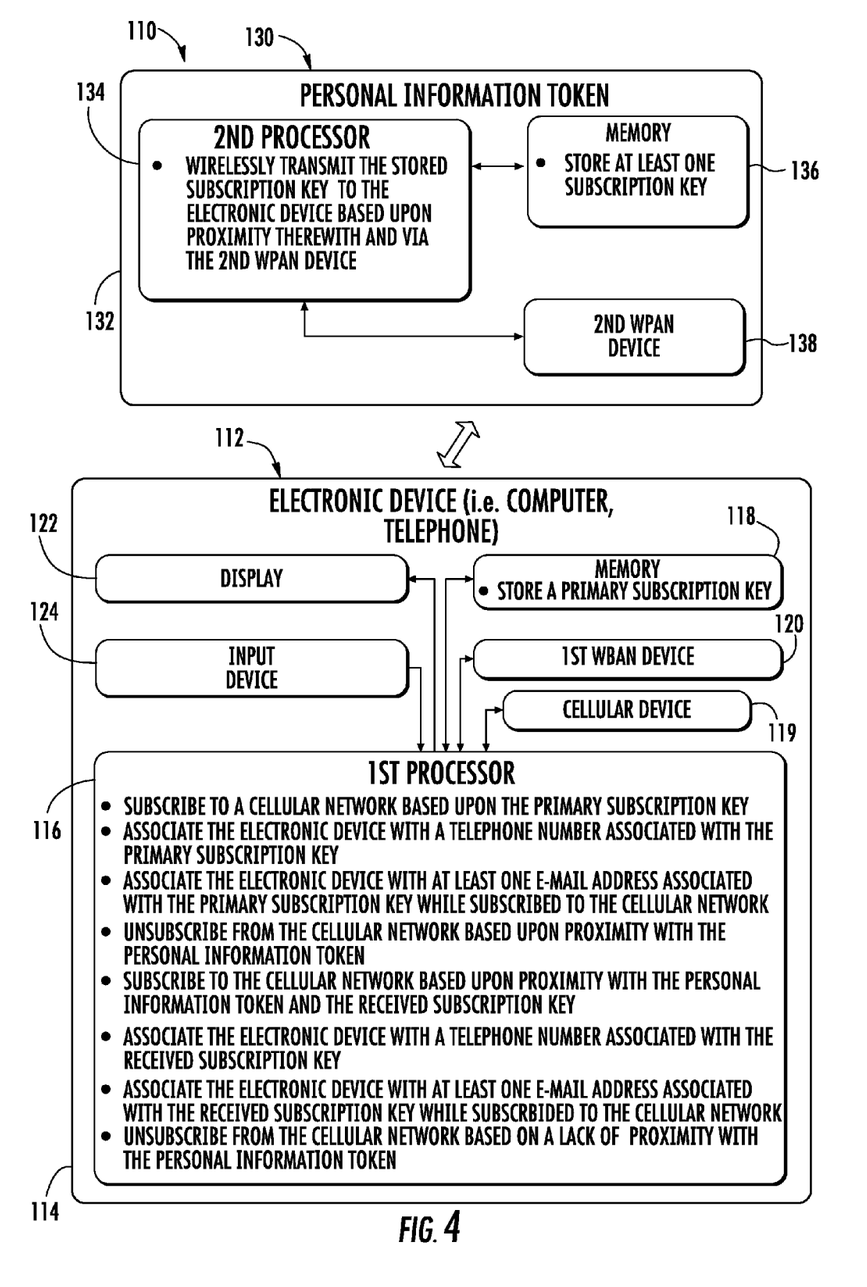
FIG. 4 is a detailed schematic block diagram of another embodiment of a communications system in accordance with an example embodiment.

Referring now to FIG. 4, an additional embodiment of the communications system 110 is now described. It should be understood that the personal information token 130 and electronic device 112 are similar to the personal information tokens 30, 30' and electronic devices 12, 12', respectively, described above, and that components thereof not specifically described with respect to FIG. 4 function similarly, needing no further discussion herein.

In this embodiment, the electronic device 112 has a cellular device 119, which may in some applications be a cellular transceiver. This cellular device 119 may be capable of one or two way cellular voice and/or data communications. The personal information token 130 may function as a SIM (subscriber information module) card, thereby enabling the electronic device 112 to receive or make phone calls, SMS messages, and e-mail messages associated with that cellular user account.

In addition, the electronic device 112 may also have a SIM card installed. For example, the memory 118 may store a primary subscription key, and the first processor 116 may subscribe the electronic device 112 to a cellular network based upon the primary subscription key. After the processor 116 subscribes the electronic device 112 to the cellular network (or as part of the subscription process), the processor associates the electronic device with a telephone number associated with the primary subscription key. Thereafter, the electronic device 112 may make and receive telephone calls using the telephone number.

In addition, also after the processor 116 subscribes the electronic device 112 to the cellular network (or as part of the subscription process), the processor optionally associates the electronic device with at least one e-mail address associated with the primary subscription key, so that the electronic device may be used to send and receive e-mail when subscribed to the cellular network.

In some applications, it may be desirable for the electronic device 112 to be associated with a plurality of accounts (via a plurality of subscription keys), or for the account to which the electronic device is associated to be switched. To effectuate this functionality, the memory 136 of the personal information token 30 may store at least one subscription key, and the second processor 134 may wirelessly transmit the stored subscription key to the electronic device 112 based upon proximity therewith and via the second WPAN device 138.

The first processor 16 may also optionally unsubscribe from the cellular network based upon proximity with the personal information token 130, and then re-subscribe to the cellular network based upon the received subscription key. After the processor 116 subscribes the electronic device 112 to the cellular network based upon the received subscription key (or as part of the subscription process), the processor associates the electronic device with a telephone number associated with the received subscription key, and optionally associates the electronic device with at least one e-mail address associated with the received subscription key while subscribed to the cellular network.

Stated differently, the electronic device 112 may disconnect from the cellular network (to which it was associated based upon the primary subscription key), and the re-associate to the cellular network based upon the received subscription key. Therefore, the electronic device 112 may be associated with a different telephone number and e-mail address based upon proximity with the personal information token 130. This advantageously allows the electronic device 112 to be used with multiple cellular accounts, or allows multiple electronic devices to be used with a single cellular account.

When the personal information token 130 is no longer in proximity to the electronic device 112, the first processor 116 may unsubscribe the electronic device from the cellular network (and then re-subscribe the electronic device to the cellular network based upon the primary subscription key, in some applications).

It should be understood that the personal information token 130 and electronic device 112 may also perform all functions as described with reference to the personal information tokens 30, 30', and electronic devices 12, 12', above.

Figure 5:
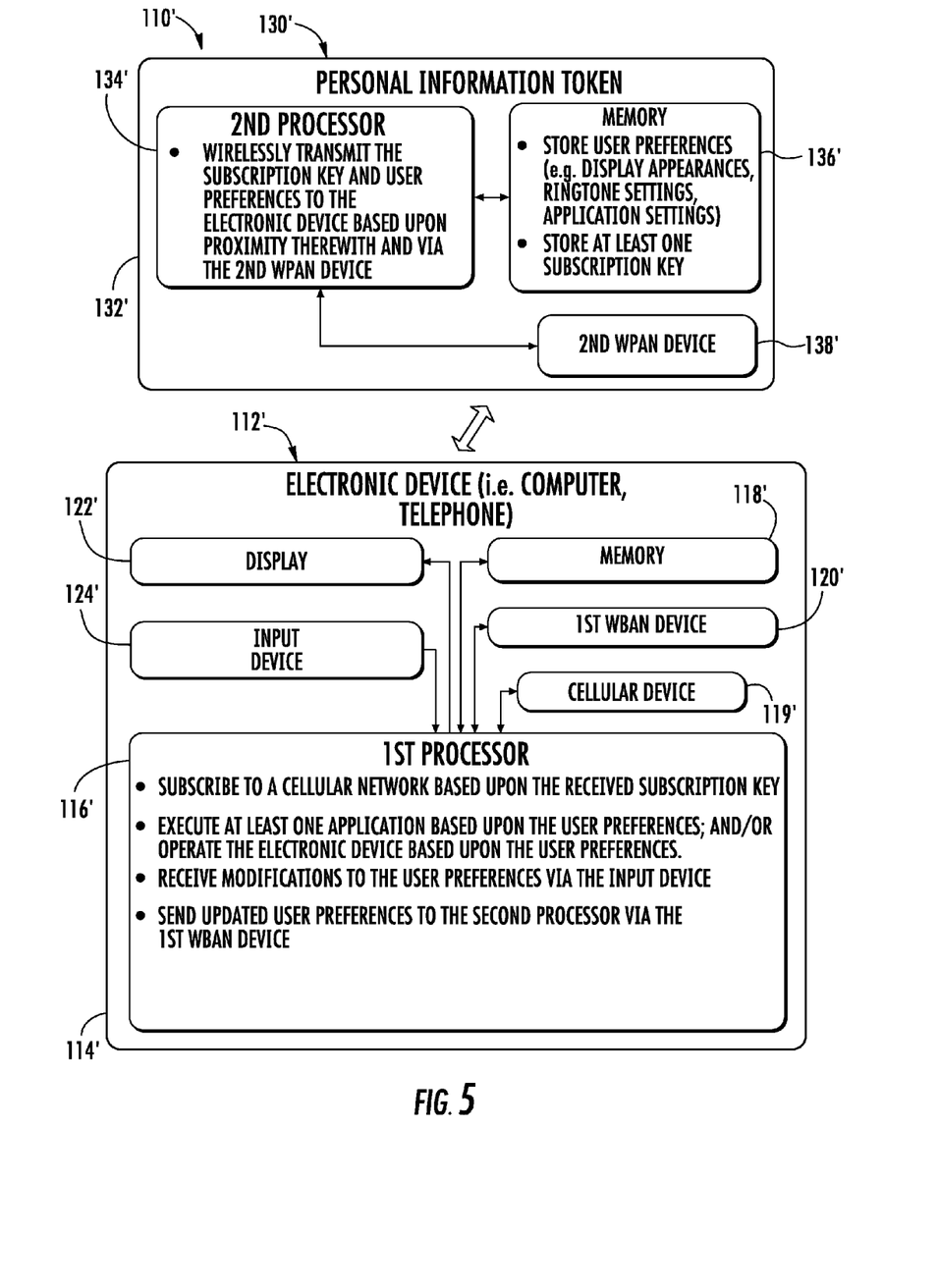
FIG. 5 is a detailed schematic block diagram of an additional embodiment of a communications system in accordance with an example embodiment.

As now explained with reference to FIG. 5 the personal information token 130' may store user preferences in the memory 136'. It should be understood that the personal information token 130' and electronic device 112' are similar to the personal information tokens 30, 30', 130 and electronic devices 12, 12', 112, respectively, described above, and that components thereof not specifically described with respect to FIG. 5 function similarly, needing no further discussion herein.

The user preferences may be associated with the execution of one or more applications by the electronic device 112', for example, and may include a display font size and type, a user interface theme, and keyboard mappings for an application. These user preferences may also include interface shortcuts for either an application, or operation of the electronic device 112' itself (i.e. a user preference may be for the electronic device to execute a given application when a certain key of the input device 124' is pressed). The user preferences may even enable or disable certain features of an application, such as spell checking or grammar checking. In fact, in some cases, the user preferences may comprise operating system preferences, such as the assignment of ring tones, or the designation of a set of preferred applications. The above examples of user preferences should be understood to be non-limiting, and it should be understood that any number of additional user preferences could be stored in the memory 136' of the personal information token 130', and that these user preferences may in fact include the personalized lists as described above.

The second processor 134' wirelessly transmits the user preferences to the electronic device 112' based upon proximity therewith and via the second WPAN device 138'. The first processor 116' then operates the electronic device 112' based upon the user preferences, which may include executing at least one application based upon the user preferences.

The first processor 116' may also receive modifications to the user preferences via the input device 124', and may send the updated user preferences to the second processor 134' via the first WBAN transceiver 120'. In addition, the first processor 114' may cease operating the electronic device 112' based upon the user preferences based upon a lack of proximity with the personal information tag 130'.

Those skilled in the art will appreciate that the personal information token 130' and electronic device 112' may also perform all functions as described with reference to the personal information tokens 30, 30', 130 and electronic device 12, 12', 112 above.

Figure 6:
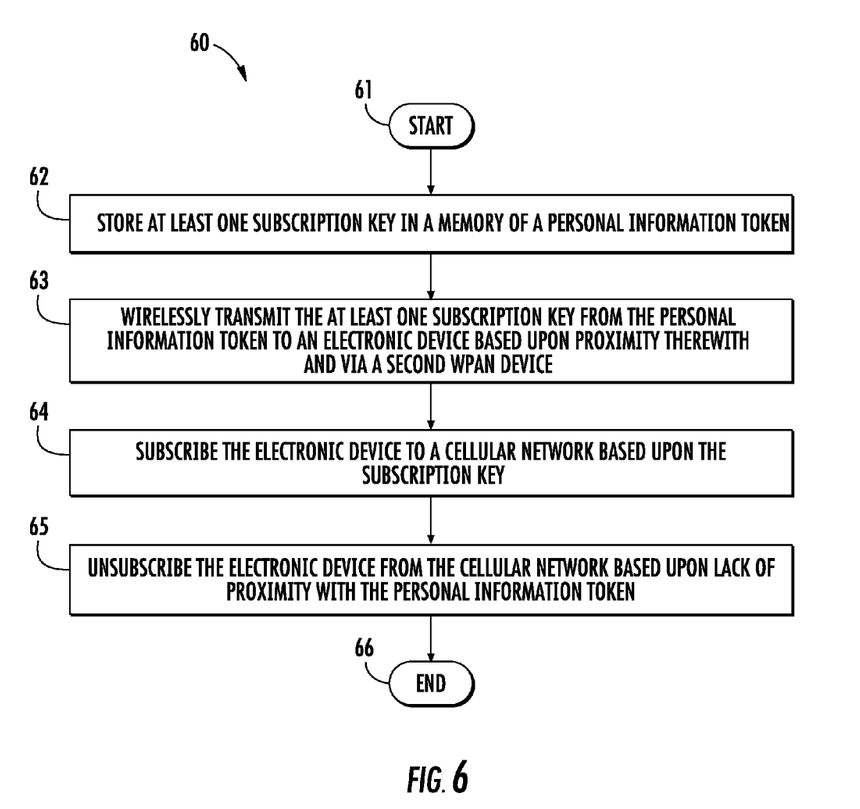
FIG. 6 is a flowchart of an example method of operating the communications system of FIG. 4.

With reference to the flowchart 60 of FIG. 6, a method of operating the communications system of the present disclosure is now described. After the start (Block 61), at least one subscription key is stored in a memory of a personal information token (Block 62). The at least one subscription key is then wireless transmitted from the personal information token to an electronic device based upon proximity therewith and via a second WPAN device (Block 63). The electronic device is then subscribed to a cellular network based upon the subscription key (Block 64). Further, the electronic device may be unsubscribed from the cellular network based upon a lack of proximity with the personal information token (Block 65). Block 66 indicates the end of the method.

Figure 7:
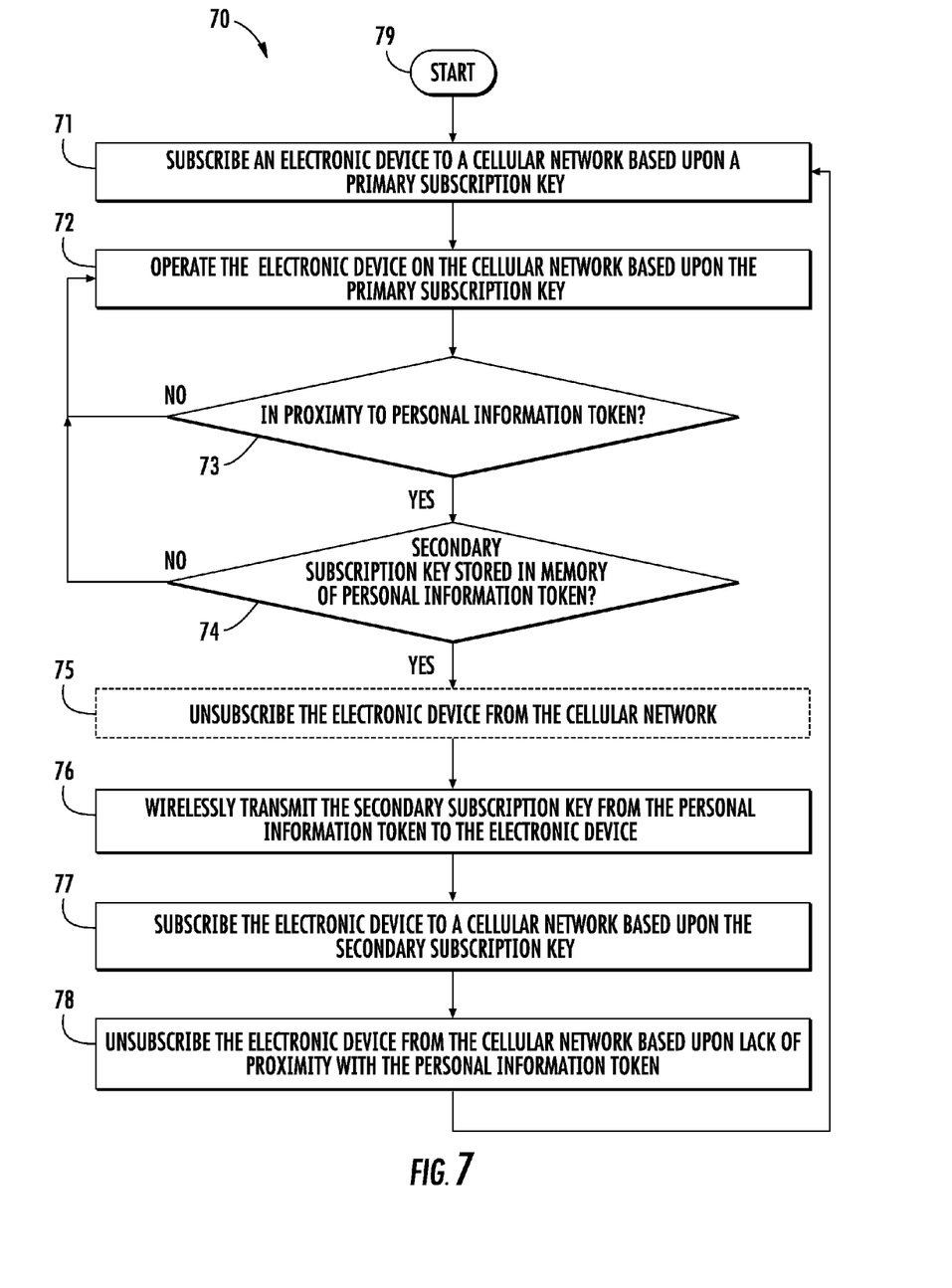
FIG. 7 is a flowchart of another example method of operating the communications system of FIG. 4.

Another method of operating the communications system of the present disclosure is now described with reference to the flowchart 70 of FIG. 7. Here, the electronic device is subscribed to a cellular network based upon a primary subscription key (Block 71), and then operates on the cellular network based upon the primary subscription key (Block 72). At Block 73, if the electronic device is not in proximity to a personal information token, it continues to operate on the cellular network based upon the primary subscription key. If the electronic device is in proximity to the personal information token at Block 73, but a secondary subscription key is not stored in the memory of the personal information token at Block 74, the electronic device also continues to operate on the cellular network based upon the primary subscription key.

If, however, the electronic device if in proximity to the personal information token at Block 73, and a secondary subscription key is stored in the memory of the personal information token at Block 74, the electronic device is then unsubscribed from the cellular network (Block 75). The secondary subscription key is then wirelessly transmitted from the personal information token to the electronic device (Block 76). The electronic device is then subscribed to the cellular network based upon the secondary subscription key (Block 77). The electronic device may then be unsubscribed from the cellular network based upon lack of proximity with the personal information token (Block 78), and may then be re-subscribed to the cellular network based upon a primary subscription key (Block 71 again).

Figure 8:
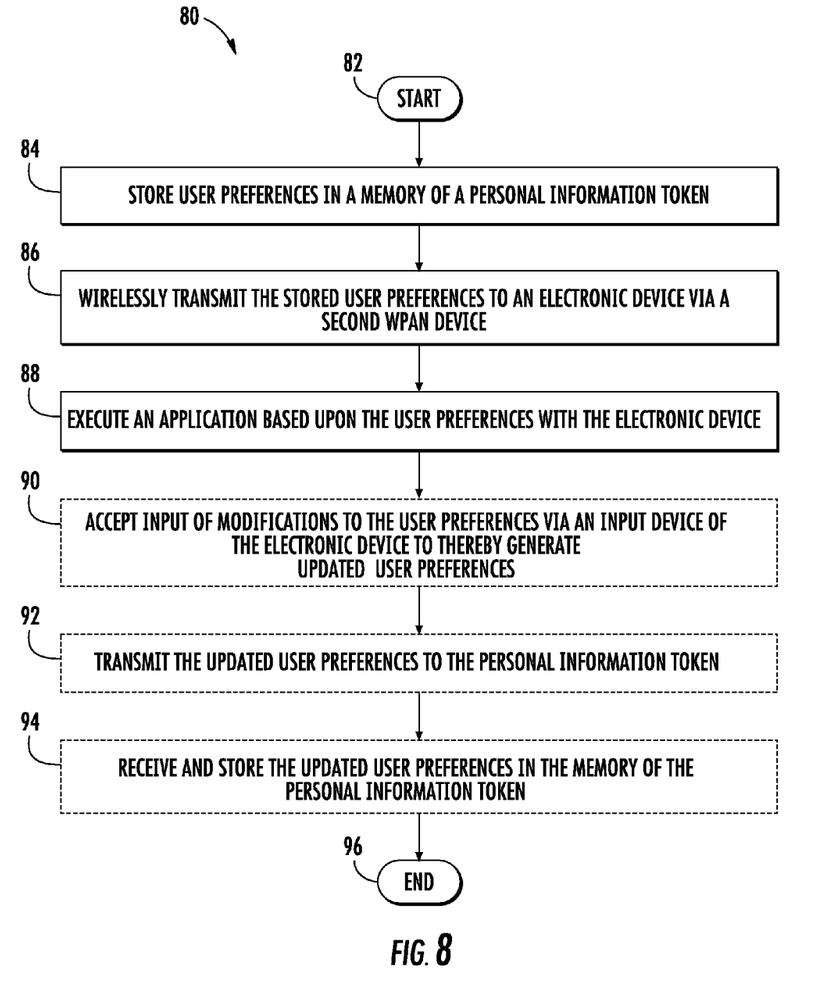
FIG. 8 is a flowchart of an example method of operating the communications system of FIG. 5.

With reference to the flowchart BO of FIG. 8, a method of operating the communications system of the present disclosure is now described. After the start (Block 82), user preferences are stored in the memory of the personal information token (Block 84). The stored user preferences are then wirelessly transmitted to the electronic device via the second WPAN device (Block 86). The first processor receives the user preferences, and executes an application based thereupon (Block 88).

Optionally, the first processor accepts input of modifications to the user preferences via the input device, and generates updated user preferences thereupon (Block 90). The updated user preferences are then transmitted to the personal information token (Block 92).

The second processor receives the updated user preferences and stores them in the memory of the personal information token (Block 94). Block 96 indicates the end of the method.

Some of the steps illustrated in the above flowcharts 60, 70, 80 may be performed in an order other than that which is described. Also, some steps may be optional, additional steps may be added, and some of the illustrated steps may be substituted with other steps.

Example components of a mobile wireless communications device 1000 that may be used in accordance with the above-described embodiments are further described below with reference to FIG. 9. The mobile wireless communications device 1000 may function as either the electronic device described above, or the personal information token as described above. The device 1000 illustratively includes a housing 1200, a keypad or keyboard 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400. Alternatively or additionally, the keypad 1400 may be a "soft" keypad implemented, for example, by providing images of keys on the display 1600.

The housing 1200 may be elongated vertically, or may take on other sizes and shapes (including clamshell housing structures). The keypad may include a mode selection key, or other hardware or software for switching between text entry and telephony entry.

Figure 9:
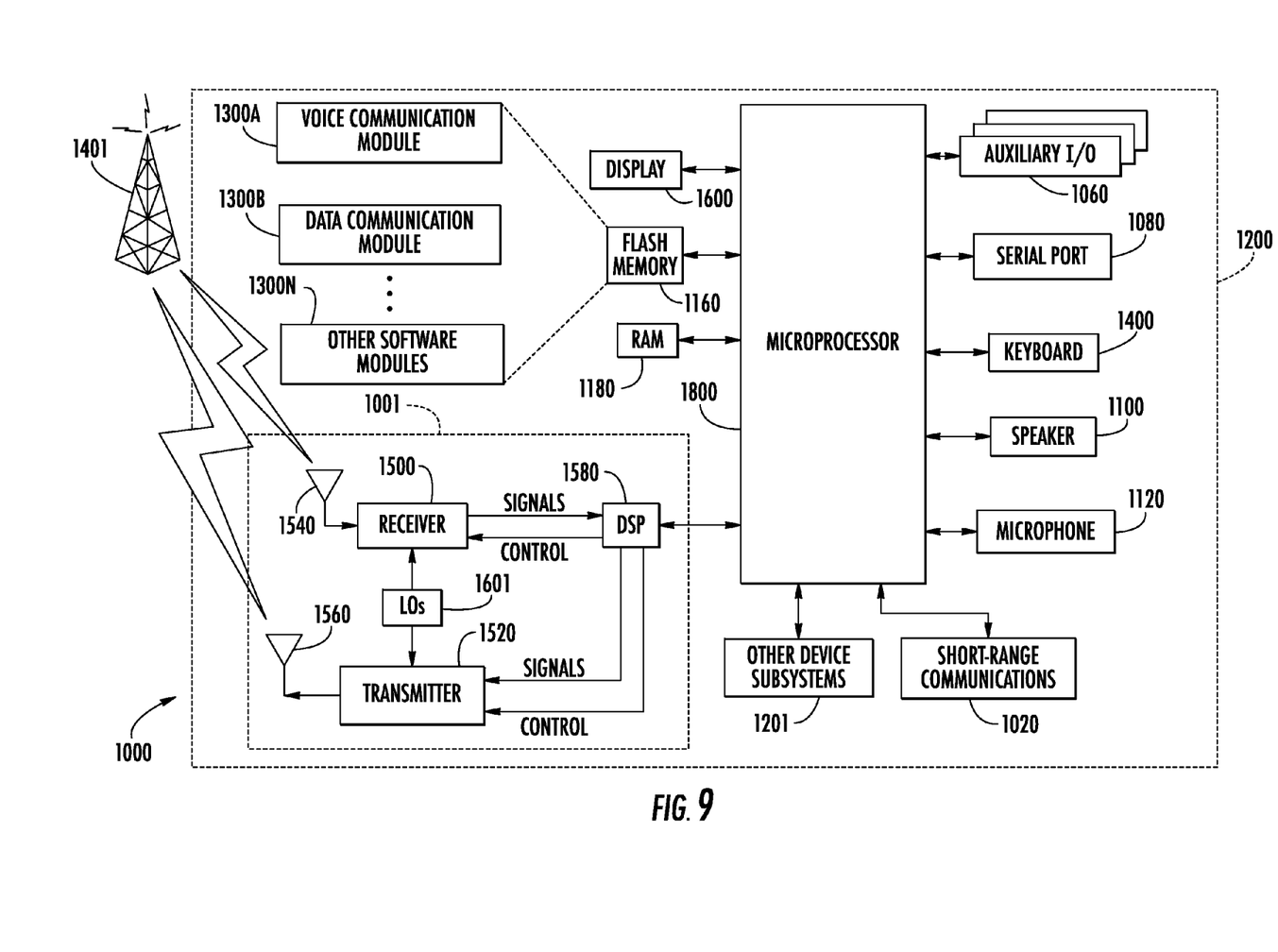
FIG. 9 is a schematic block diagram illustrating example components which may be used in the communications systems of FIGS. 1, 2, 4, and 5 in accordance with an example embodiment.

In addition to the processing device 1800, other parts of the mobile device 1000 are shown schematically in FIG. 9. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary input/output (I/O) device 1060. A device may also be used to compose data items, such as e-mail messages, using the keypad 1400 and/or some other auxiliary I/O device 1060, such as a trackball, a touchpad, a rocker switch, a thumb-wheel, touch sensitive display or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices. The short-range communications subsystem may also include a wireless personal area network (WPAN) module, or near field communications (NFC) module, for example.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electronic device capable of communicating with a cellular network, the electronic device comprising:
   a cellular device;
   a wireless personal area network (WPAN) device; and
   a processor coupled with said cellular device and said WPAN device configured to
      receive at least one subscription key from a personal information token through said WPAN device based upon proximity therewith, subscribe said electronic device to the cellular network based upon the subscription key, and
   associate said electronic device with at least one telephone number associated with the at least one subscription key when said electronic device is subscribed to the cellular network.

2. The electronic device of claim 1, wherein said processor is further configured to associate said electronic device with an email address associated with the subscription key when said electronic device is subscribed to the cellular network.

3. The electronic device of claim 2, wherein said processor is further configured to store a primary subscription key, to subscribe said electronic device to the cellular network based upon the primary subscription key, and to associate said electronic device with an email address associated with the primary subscription key.

4. The electronic device of claim 1, wherein said processor is further configured to unsubscribe said electronic device from the cellular network based upon a lack of proximity with said personal information token.

5. The electronic device of claim 1, wherein said processor is further configured to receive a personal preference, via said WPAN device, based upon proximity with the personal information token; and wherein said processor is further configured to operate based upon the personal preference.

6. The electronic device of claim 5, wherein the personal preference comprises at least one of a display appearance, a ringtone setting, or an application setting.

7. The electronic device of claim 5, wherein the personal preference comprises at least one personalized list; further comprising a display coupled with said processor; and wherein said processor is configured to operate based upon the personalized list by displaying the at least one personalized list on said display.

8. The electronic device of claim 7, wherein the at least one personalized list comprises at least one of a contacts list or a favorite web sites list.

9. The electronic device of claim 5, wherein said processor is configured to reduce operation based upon one of the personal preference and passage of a period of time.

10. The electronic device of claim 1, wherein said personal information token is configured to enable operation of said electronic device.

11. The electronic device of claim 1, wherein said WPAN device comprises a wireless body area network (WBAN) transceiver.

12. A personal information token comprising:
d a processor and a WPAN device coupled therewith, the processor being configured to:
store at least one subscription key,
cause the WPAN device to wirelessly transmit the at least one subscription key to an electronic device based upon proximity therewith, said electronic device using the at least one subscription key to subscribe to a cellular network based upon the at least one subscription key, and
to associate said electronic device with a telephone number associated with the at least one subscription key when said electronic device is subscribed to the cellular network.

13. The personal information token of claim 12, wherein said processor is further configured to associate said electronic device with a an email address associated with a primary subscription key.

14. The personal information token of claim 12, wherein said processor is further configured to associate said electronic device with at least one e-mail address associated with the subscription key when said electronic device is subscribed to the cellular network.

15. The personal information token of claim 12, wherein said processor is further configured to unsubscribe said electronic device from the cellular network based upon a lack of proximity with said electronic device.

16. A method for use by an electronic device comprising a cellular device and a wireless personal area network (WPAN) device coupled with a processor, the method comprising:
receiving at least one subscription key from an information token through the WPAN device based upon proximity therewith so that the processor, via the cellular device, subscribes the electronic device to a cellular network based upon the subscription key; and
associating the electronic device with at least one telephone number associated with the subscription key when the electronic device is subscribed to the cellular network, using the processor.

17. The method of claim 16, further comprising associating the electronic device with an email address associated with the subscription key when the electronic device is subscribed to the cellular network, using the processor.

18. The method of claim 17, further comprising storing a primary subscription key, subscribing the electronic device to the cellular network based upon the primary subscription key, and associating the electronic device with an email address associated with the primary subscription key, using the processor.

19. The method of claim 16, further comprising unsubscribing the electronic device from the cellular network based upon a lack of proximity with the information token, using the processor.

20. The method of claim 16, further comprising wirelessly receiving a personal preference, via the WPAN device, based upon proximity with the information token; and further comprising configuring the processor to operate based upon the personal preference.

* * * * *